United States Patent [19]

Nakamura

[11] Patent Number: 4,815,802

[45] Date of Patent: Mar. 28, 1989

[54] SURFACE ACOUSTIC WAVE GENERATING APPARATUS INCLUDING A POSITIVE FEEDBACK-TYPE GENERATOR

[75] Inventor: Kenji Nakamura, Yokohama, Japan

[73] Assignee: Canon Kabushiki Kaisha, Tokyo, Japan

[21] Appl. No.: 804,182

[22] Filed: Dec. 3, 1985

[30] Foreign Application Priority Data

Dec. 3, 1984 [JP] Japan .................. 59-254133

[51] Int. Cl.[4] .................. G02B 6/10; H03H 9/00; G09G 3/02; G02F 1/11
[52] U.S. Cl. .................. 350/96.13; 350/96.14; 350/358; 333/145; 340/712
[58] Field of Search ............... 350/96.10, 96.12, 96.13, 350/96.14, 358; 333/141, 145, 150, 187; 340/712, 711; 178/18

[56] References Cited

U.S. PATENT DOCUMENTS

| | | | |
|---|---|---|---|
| 3,655,621 | 4/1972 | Chang .......................... | 350/96.13 |
| 3,850,503 | 11/1974 | Riseberg et al. ................ | 350/96.13 |
| 4,055,821 | 10/1977 | Wagers et al. .................. | 333/187 |
| 4,063,198 | 12/1977 | Wagers et al. .................. | 333/150 |
| 4,315,693 | 2/1982 | Walker ........................... | 356/350 |
| 4,470,661 | 9/1984 | Matsumoto ..................... | 350/96.13 |
| 4,530,573 | 7/1985 | Wolkstein ..................... | 350/96.13 X |
| 4,604,707 | 8/1986 | Yamashita et al. .............. | 350/358 |

FOREIGN PATENT DOCUMENTS 0192232 10/1984 Japan .................. 350/96.13

OTHER PUBLICATIONS

"Surface Wave Device and Application Thereof", Nikkan Kogyo Shinbunsha, Dec. 1978, pp. 183–185 (Japanese with English Translation).
"Study of C/N of SAW-VCO", Electronic Communication Society Overall National Meeting, 1980, pp. 1–91 (Japanese with English Translation).
"Broadband Modified Chirp Transducers", by Joseph et al, Jan. 1980, Conference: Integrated and Guided--Wave Optics, Technical Digest.

Primary Examiner—William L. Sikes
Assistant Examiner—Akm E. Ullah
Attorney, Agent, or Firm—Fitzpatrick, Cella, Harper & Scinto

[57] ABSTRACT

A surface acoustooptic wave deflector comprises: a thin film optical wave guide path; an input photocoupler for guiding a light onto the optical guidewave path from the outside; at least one surface acoustic wave exciting device for exciting a surface acoustic wave which is transmitted in the optical waveguide path, a part of this surface acoustic wave crossing the light which is transmitted in the optical waveguide path and deflecting the light due to an acoustooptical effect; at least one surface acoustic wave receiving device provided in the transmitting path of the surface acoustic wave which is excited by the surface acoustic wave exciting device; at least one external circuit including an amplifier, this external circuit forming a closed loop together with the exciting device and the wave receiving device and constituting a positive feedback type generator; and an output photo coupler for outputting the transmitted light to the outside.

9 Claims, 8 Drawing Sheets $$\phi_{S1} = 2n\pi - \phi_A - \phi_{P1}$$

$$\phi_{S2} = 2n\pi - \phi_A - \phi_{P2}$$

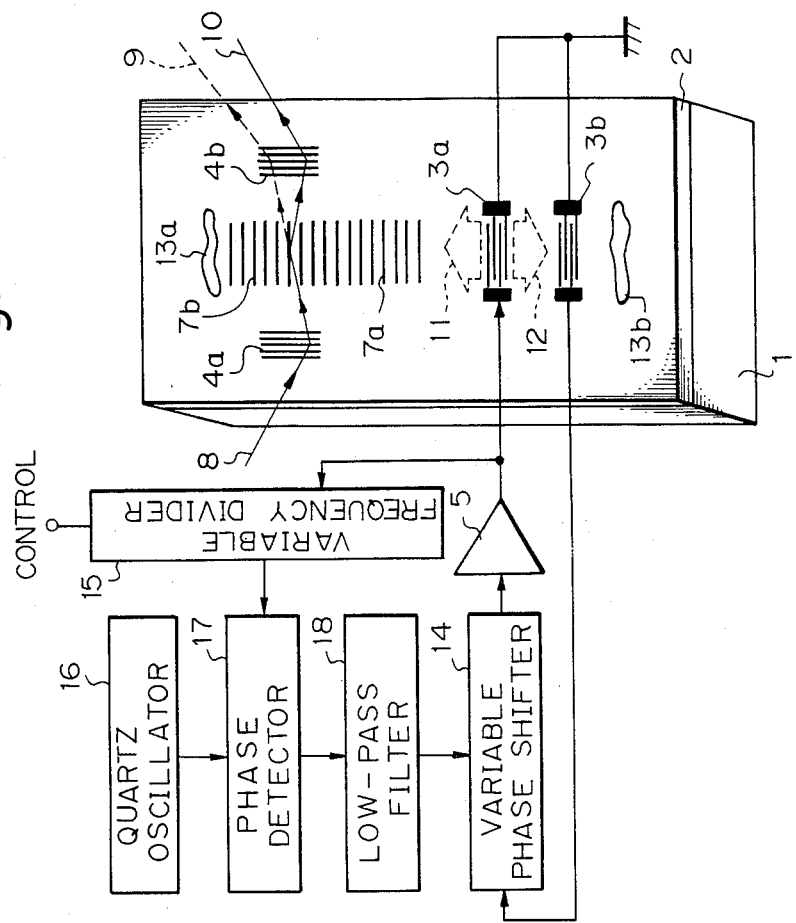

4,815,802

SURFACE ACOUSTIC WAVE GENERATING APPARATUS INCLUDING A POSITIVE FEEDBACK-TYPE GENERATOR

BACKGROUND AND SUMMARY OF THE INVENTION

The present invention relates to a surface acoustooptic wave deflector for deflecting the light which is transmitted in a thin film optical waveguide path due to a surface acoustic wave.

Surface acoustooptic wave deflectors are acoustic optical devices using the technology in which the flux of light which is transmitted in the thin film optical waveguide path is deflected due to the surface acoustic wave generated in this path. Recently, such deflectors have been becoming important more and more as devices for light control.

FIG. 1 is a schematic perspective view showing an example of surface acoustooptic wave deflectors which are used hitherto. A general function of this deflector will now be described hereinbelow with reference to FIG. 1.

In FIG. 1, reference numeral 1 denotes a substrate of an optical waveguide path; 2 is a thin film optical waveguide path; 3 a comb shaped electrode for excitation of a surface acoustic wave; 4a an input photocoupler; and 4b an output photo coupler. A piezoelectric crystal such as, e.g., LiNbO$_3$ or the like is used as the substrate 1. A layer of a high refractive index formed on the surface of the crystal to have about a few microns is used as the thin film optical waveguide path 2. Or, a non-piezoelectric crystal such as, e.g., Si may be used as the substrate 1. In this case, a thin film formed of a piezoelectric material such as ZnO may be used as the path 2.

A surface acoustic wave 7a excited by the comb shaped electrode 3 is transmitted in the path 2 and crosses a laser beam guided into the path 2 from the input photo coupler 4a, so that the laser beam is Bragg-diffracted due to the periodic change of the refractive index in the optical waveguide path which is caused by the surface acoustic wave.

To excite the surface acoustic wave in such a surface acoustooptic wave deflector, it is necessary to apply a high frequency signal of a desired frequency and a desired electric power to the comb shaped electrode 3. To change a deflection angle in the deflector, it is necessary to cause the frequency of the high frequency signal which is applied to the electrode 3 to be changed within the frequency band of the electrode 3. Hitherto, this kind of high frequency signal has been generated by providing a variable frequency generator 6 and an amplifier 5 in addition to the surface acoustooptic wave deflector.

In FIG. 1, an incident laser beam 8 is transmitted into the path 2 on the substrate 1 due to the input photo coupler 4a (grating coupler in the case of FIG. 1). In the case where the surface acoustic wave is not excited, the incident laser beam is outputted to the outside as a non-diffracted light 9 by the output photo coupler 4b. On the other hand, the high frequency signal generated by the variable frequency generator 6 is amplified to a desired electric power by the amplifier 5 and applied to the electrode 3, by which it is converted to a surface acoustic wave and transmitted in the directions indicated by arrows 11 and 12. The wave surface of the surface acoustic wave 7a transmitted in the direction of the arrow 11 is preset so as to keep the angle between the wave surface and the laser beam such as to satisfy the Bragg condition, thereby causing the Bragg diffraction for the flux of laser beam. The flux of light in the optical waveguide path is deflected due to such an effect and outputted to the outside as a diffracted light 10 by the output photo coupler 4b. The surface acoustic wave 7b after causing the Bragg diffraction for the flux of light and the surface acoustic wave transmitted in the direction of the arrow 12 are reflected by the edge surface of the substrate 1 and absorbed by absorbing materials 13a and 13b to prevent the occurrence of the unnecessary secondary effect. As the oscillating frequency of the variable frequency generator 6 is changed, the wavelength of the surface acoustic wave which is excited by the comb shaped electrode 3, namely, the pitch of the wave surface of the surface acoustic wave 7a varies and the diffraction angle of the flux of light also changes, so that the direction of the output light 10 can be changed.

However, the conventional surface acoustooptic wave deflector as shown in FIG. 1 has the following drawbacks.

1. The variable frequency generator 6 is indispensable.
2. The variable range of frequency of the generator 6 must be wider set than the frequency band of the comb shaped electrode 3 in consideration of the manufacturing deviation and the temperature characteristic, so that it is disadvantageous in terms of the cost and signal purity which is generated, namely, the signal purity of the surface acoustic wave.
3. The surface acoustic wave 12 which is generated and transmitted from the electrode 3 in the direction opposite to the Bragg diffraction area is absorbed by the absorbing material 13b without acting at all; thus, it is wasted. In addition, unless the surface acoustic wave 12 is effectively absorbed, it is reflected by the edge surface of the crystal and transmitted in the same direction as the arrow 11, so that the deflection characteristic is adversely influenced.

It is an object of the present invention to solve at least one of the problems of the conventional technology as mentioned above.

To accomplish this object, a surface acoustooptic wave deflector according to the present invention is constituted in a manner such that in the transmission path of the surface acoustic wave which is excited by the surface acoustic wave exciting means such as the comb shaped electrode for excitation, the surface acoustic wave receiving means such as the receiving comb shaped electrode for receiving the surface acoustic wave is provided, and these exciting means and receiving means and an external circuit including an amplifier form a closed loop and constitute a positive feedback type generator.

BRIEF EXPLANATION OF THE DRAWINGS

FIGS. 7 and 8 are schematic perspective views of the third and fourth embodiments of the invention.

DETAILED DESCRIPTION OF THE PREFERRED EMBODIMENTS

Practical embodiment of the present invention will now be described hereinbelow with reference to FIGS. 2 to 8.

Figure 2:
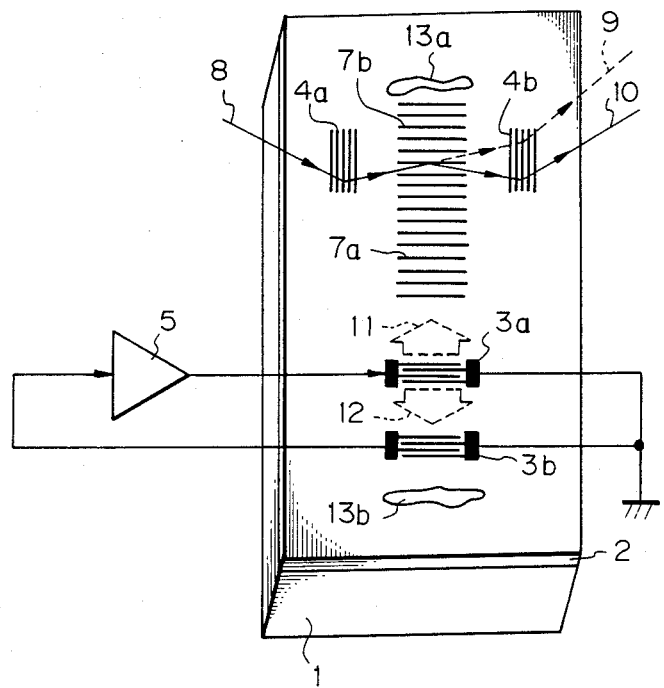
FIG. 2 is a schematic perspective view of the first embodiment of the present invention.

FIG. 2 is a schematic perspective view of the first embodiment of the present invention. In FIG. 2, reference numeral 1 denotes the substrate of the optical waveguide path; 2 is the thin film optical waveguide path; 3a a comb shaped electrode for excitation of a surface acoustic wave; 3b a comb shaped electrode for reception of the surface acoustic wave; 4a the input photo coupler; 4b the output photo coupler; and 5 the amplifier. Since the electrodes 3a and 3b and amplifier 5 form a closed loop, assuming that a gain of the amplifier is G, a phase rotation amount of this amplifier is $\phi_A$, an insertion loss between the comb shaped electrodes in which and from which the surface acoustic wave is inputted or outputted is $IL_S$, and a phase rotation amount of this insertion is $\phi_S$, the above-mentioned closed loop oscillates when the following conditions are satisfied.

Loss condition: $G \geq IL_S$

Phase condition: $\phi_S + \phi_A = 2n\pi$ (n is a natural number)

Figure 3:
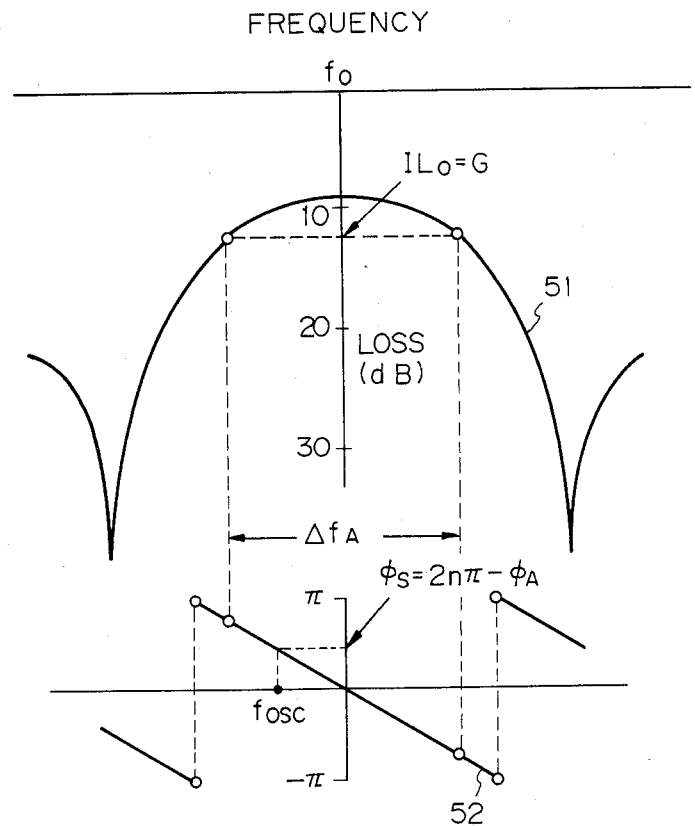
FIG. 3 is a diagram for explaining a frequency characteristic of a surface acoustic wave comb shaped electrode and a method of determining an oscillating frequency of the first embodiment.

FIG. 3 shows an example of a frequency characteristic of the surface acoustic wave comb shaped electrode, in which reference numeral 51 denotes a frequency characteristic of the loss and 52 represents a frequency characteristic of the phase rotation amount. The band width which satisfies the loss condition, namely, the frequency range $\Delta f_A$ which satisfies $IL_S \leq IL_0$ (indication in the case where G is expressed as an insertion loss) = G is determined by the number of pairs of comb shaped electrodes, cross width, substrate material, and the like. The gradient of the phase rotation amount is decided by the distance between the input and output comb shaped electrodes. Therefore, by selecting the number of pairs of electrodes, the distance between the electrodes, etc. to desirable values, the relative phase rotation amount of the frequency range in which the insertion loss is below $IL_0$ can be reduced than $2\pi$ as shown in FIG. 3. In this case, the frequency $f_{OSC}$ which simultaneously satisfies both two expressions of the loss and phase conditions is unconditionally decided since the phase rotation amount $\phi_A$ of the amplifier has also been determined. In other words, the closed loop oscillates at a certain single frequency which is decided by the number of electrode pairs and the distance between the electrodes.

Figure 1:
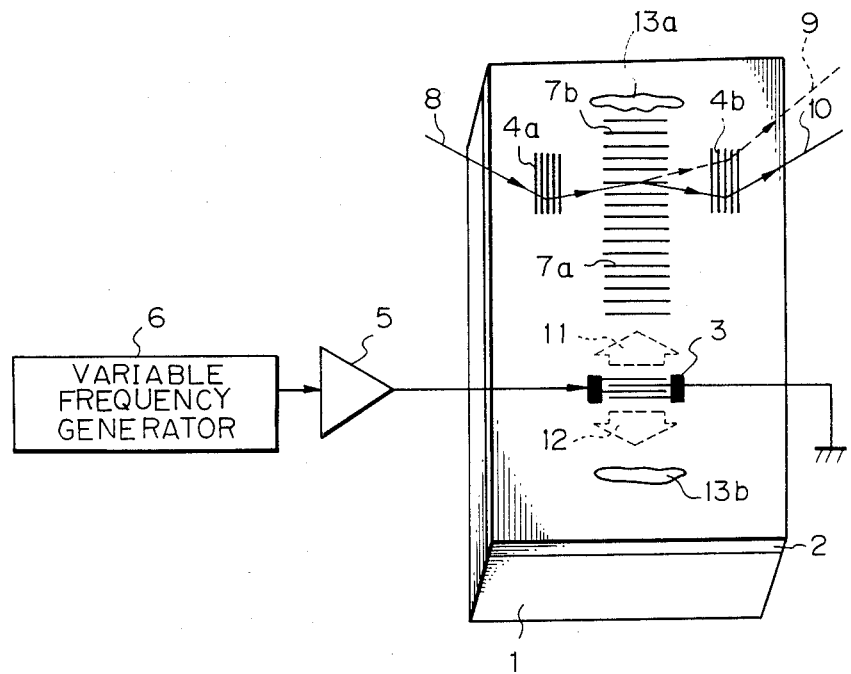
FIG. 1 is a schematic perspective view of a constitution of a conventional surface acoustooptic wave deflector.

In FIG. 2, when the closed loop oscillates, the surface acoustic wave is transmitted from the comb shaped electrode 3a in the directions of the arrows 11 and 12. The surface acoustic wave transmitting in the direction of the arrow 11 deflects the flux of light of the thin film optical waveguide path 2 in a manner similar to the conventional example shown in FIG. 1, and thereafter it is absorbed by the absorbing material 13a. On the other hand, the surface acoustic wave transmitting in the direction of the arrow 12 is converted to an electrical signal by the comb shaped electrode 3b as mentioned above and becomes a positive feedback signal for oscillation of the closed loop. In the surface acoustic wave transmitted in the direction of the arrow 12, the surface acoustic wave transmitted without being converted to the electrical signal by the electrode 3b is absorbed by the absorbing material 13b.

Since the oscillation level of the closed loop is nearly equal to the saturation output level of the amplifier 5, in order to set the electric power of the surface acoustic wave which is excited by the electrode 3a to a desired value, the saturation output level of the amplifier 5 may be set to the level in accordance with this desired value.

In this embodiment, the oscillating frequency by the closed loop is a single frequency as mentioned above and can be used for the applications such that the switching between the diffracted light 10 and the non-diffracted light 9 is performed due to the ON/OFF of the power supply of the amplifier 5 and the ratio between the diffracted light 10 and the non-diffracted light 9 is changed by changing the saturation output level of the amplifier 5.

Figure 4:
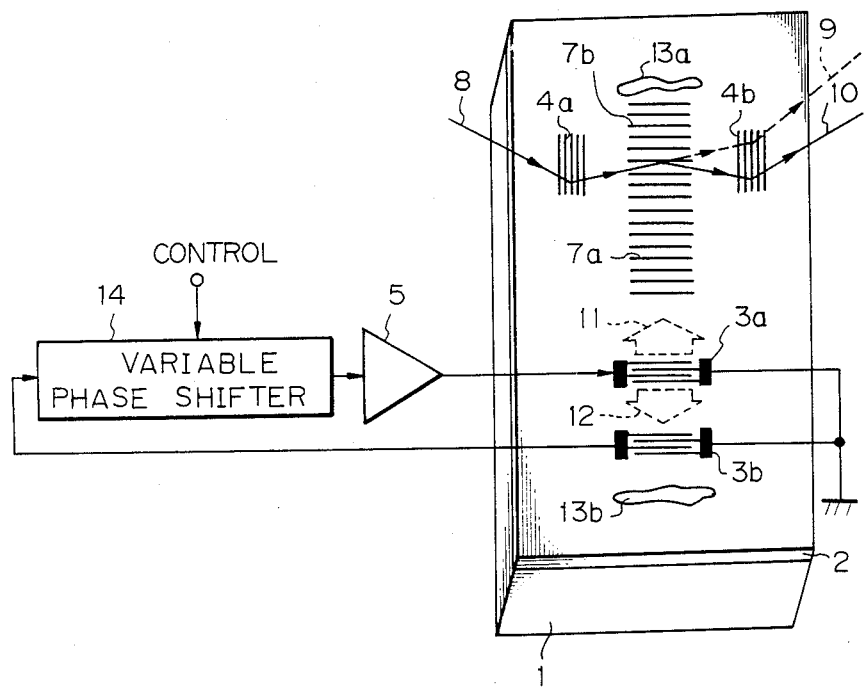
FIG. 4 is a schematic perspective view of the second embodiment of the invention.

FIG. 4 is a schematic perspective view of the second embodiment of the invention. Although the diffraction angle is also a single angle since the oscillating frequency of the closed loop is a single frequency in the first embodiment as mentioned above, the second embodiment enables the diffraction angle of the flux of light to be changed by changing the oscillating frequency of the closed loop due to an external control. In FIG. 4, the closed loop is constituted by the comb shaped electrode 3a for excitation of the surface acoustic wave, comb shaped electrodes 3b for reception of the surface acoustic wave, amplifier 5, and a variable phase shifter 14. Assuming that an insertion loss of the variable phase shifter 14 is $IL_P$ and a phase rotation amount thereof is $\phi_P$, the oscillating conditions of the closed loop are Loss condition: $G \geq IL_S + IL_P$ Phase condition: $\phi_S + \phi_A + \phi_P = 2n\pi$ (n is a natural number)

Figure 5:
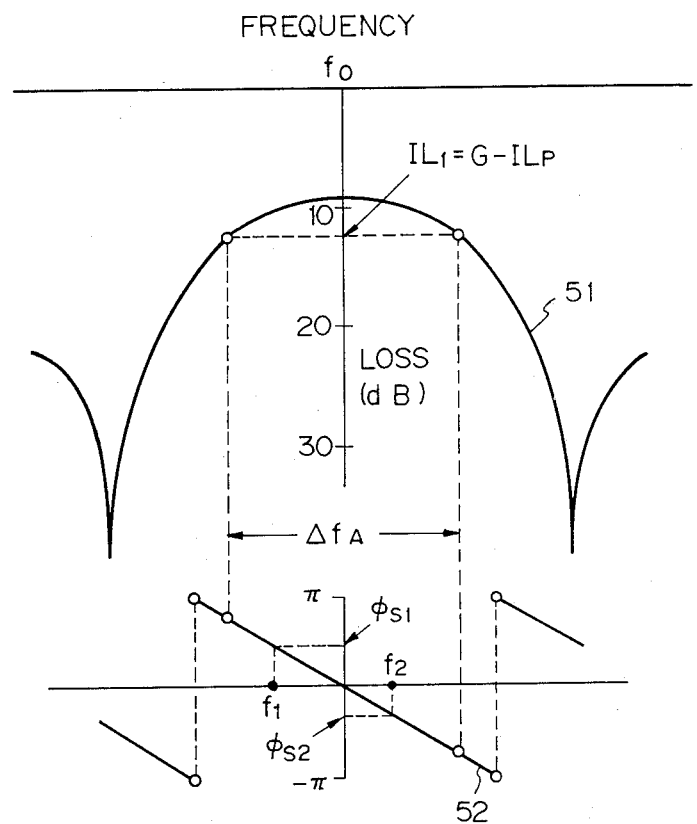
FIG. 5 is a diagram for explaining a frequency characteristic of a surface acoustic wave comb shaped electrode and that an oscillating frequency of the second embodiment is variable.

FIG. 5 shows an example of a frequency characteristic of the surface acoustic wave comb shaped electrode. The frequency range $\Delta f_A$ which satisfies the loss condition becomes $$IL_S \leq IL_1 = G - IL_P$$

and the closed loop can oscillate in this range. When the phase rotation amount of the variable phase shifter is $\phi_{P1}$, the phase rotation amount $\phi_{S1}$ between the input and output comb shaped electrodes which satisfies the foregoing phase condition is $$\phi_{S1} = 2n\pi - \phi_A - \phi_{P1}$$

As shown in FIG. 5, the closed loop oscillates at a frequency $f_1$ in this case. When the phase rotation amount of the phase shifter 14 varies to $\phi_{P2}$, the phase rotation amount between the input and output comb shaped electrodes becomes $$\phi_{S2} = 2n\pi - \phi_A - \phi_{P2}$$

due to the phase condition and the oscillating frequency of the loop changes to $f_2$ as shown in FIG. 5.

Figure 6A:
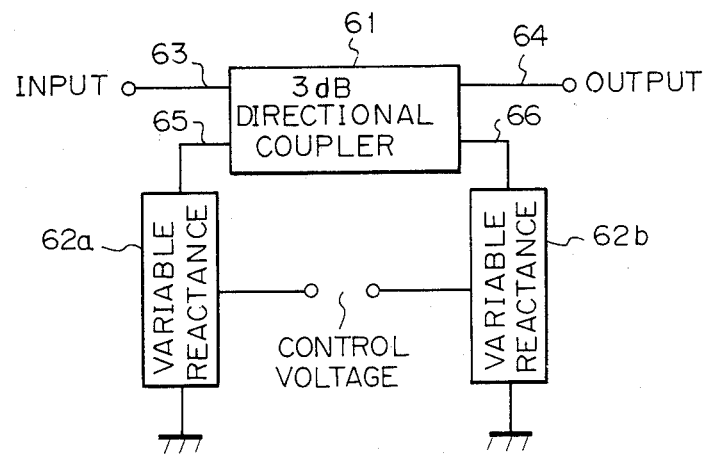
FIGS. 6A and 6B are diagrams showing a method of realizing a voltage controlled variable phase shifter in the second embodiment.
Figure 6B:
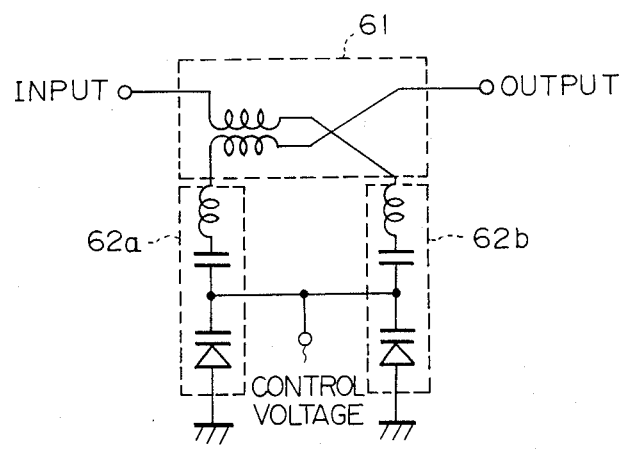

FIGS. 6A and 6B are diagrams showing a method of embodying a voltage controlled variable phase shifter as an example of the variable phase shifter 14. FIG. 6A is a diagram for explaining the principle and FIG. 6B shows an example of the circuit. Such a voltage controlled variable phase shifter has been analyzed in detail in, for example, Nakamura, Sugawara, Yamamoto, "A Study With Regard to a Variable Phase Shifter for a Voltage Controlled Oscillator due to a Surface Acoustic Wave Delay Line (SAW-VCO)", Divisional National Convention of IECE (Institute of Electronics and Communication Engineers of Japan), 1980, page 469.

In this report, the variable phase shifter with a low loss and a large change width of phase amount has been proposed.

In FIG. 6A, the high frequency signal inputted from an input terminal 63 is divided into two signals by a 3 dB directional coupler 61 and outputted to terminals 65 and 66 and reflected by variable reactances 62a and 62b. Thereafter, those signals are again inputted through the terminals 65 and 66 and synthesized by the directional coupler 61 and outputted from an output terminal 64. When reactances of the variable reactances 62a and 62b vary, the phase components of reflection coefficients also change, so that the phase rotation amount between the input and output terminals 63 and 64 changes.

When such a voltage controlled variable phase shifter is used in the second embodiment of the present invention shown in FIG. 4, the oscillating frequency of the closed loop changes in dependence on a DC control voltage which is applied to the variable phase shifter 14. Thus, the deflection angle of the flux of light can be controlled by the DC voltage. The variable width of frequency of the closed loop substantially coincides with the band widths of the comb shaped electrodes 3a and 3b in principle in terms of the structure of this loop. Consequently, the oscillating signal purity can be improved more than that of the conventional surface acoustooptic wave deflector which needs to set the variable width of the variable frequency generator to be wider than the band width which is used.

FIG. 7 is a schematic perspective view showing the third embodiment of the invention. In FIG. 7, an oscillating loop is a phase locked loop frequency synthesizer comprising: the comb shaped electrodes 3a and 3b; amplifier 5; voltage controlled variable phase shifter 14; a variable frequency divider 15; a quartz oscillator 16; a phase detector 17; and a low-pass filter 18. In such a synthesizer, a signal generated is frequency divided by the variable frequency divider 15 which is controlled by a digital signal from the outside, and its phase is always compared with the phase of a reference signal generated from the quartz oscillator 16, thereby to lock the phase to that of the reference signal. Therefore, the surface acoustooptic wave deflector of the third embodiment has an advantage such that a stability of the signal which is generated, namely, stability of the surface acoustic wave is nearly as good as that of the quartz oscillator. Further, the frequency of the signal which is generated can be controlled by a digital signal from the outside, so that there is another advantage such that the deflection angle of the flux of light can be digitally controlled.

Figure 8:
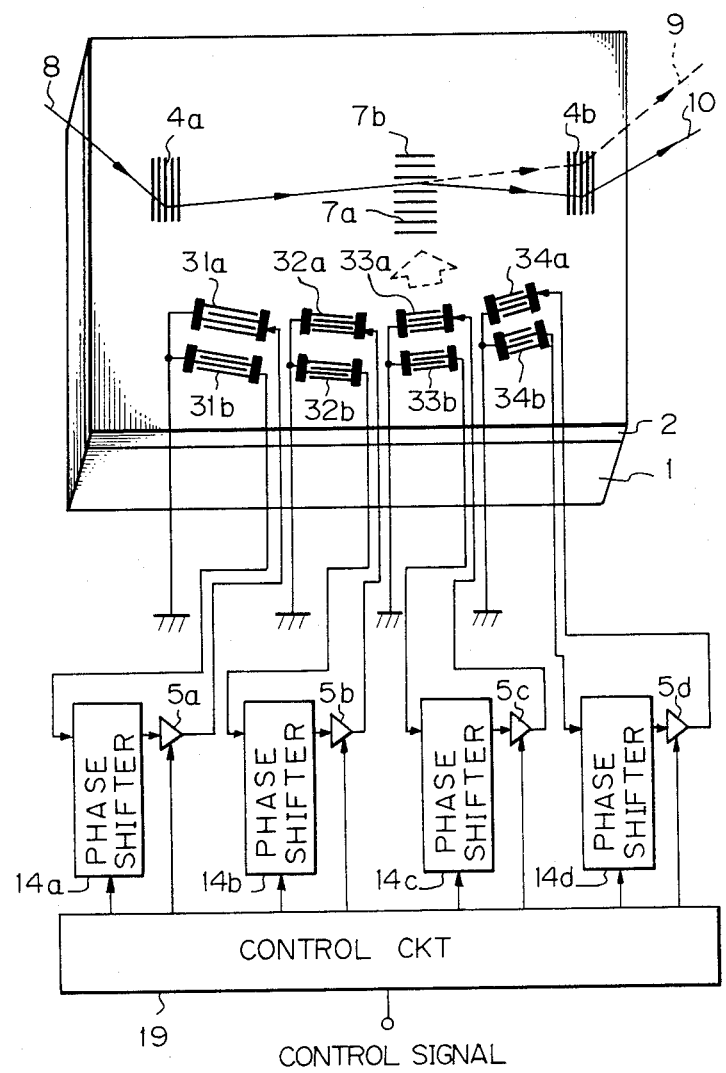

FIG. 8 is a schematic perspective view of the fourth embodiment of the invention, in which reference numerals 31a, 32a, 33a and 34a denote a multiple tilted transducer array of comb shaped electrodes. This array has been disclosed in detail in, for example, C. S. Tsai, "Guided-Wave Acoustooptic Bragg Modulators for Wide-Band Integrated Optic Communications and Signal Processing", IEEE Transactions on Circuits and Systems, Vol. CAS-26, 1702–1098, (1979).

This method has been known as a method which is effective for the wide-band operation of the comb shaped electrode, namely, for enlarging the deflection angle of the flux of light. Hitherto, the high frequency signal which is applied to the foregoing array has been generated by a variable frequency generator of a wide band having the frequency band widths of all sets of comb shaped electrodes as a variable range. However, when the ratio of this variable range with respect to the band width exceeds 100%, the generation of higher harmonics in the wide-band generator provided for all sets of comb shaped electrodes causes the characteristic of the optical deflector to deteriorate.

In this embodiment, the receiving comb shaped electrodes 31b, 32b, 33b and 34b, amplifiers 5a, 5b, 5c and 5d, and variable phase shifters 14a, 14b, 14c and 14d are provided for each of the comb shaped electrodes 31a, 32a, 33a and 34a of the array. The surface acoustic waves which are generated from the individual sets of electrodes 31a to 34a of the array are controlled by the ON/OFF signals of the amplifiers 5a to 5d and control signals of the variable phase shifters 14a to 14d which are generated from a control circuit 19.

In the fourth embodiment, respective generators are constituted for the individual sets of comb shaped electrodes 31a to 34a, so that the higher harmonics as mentioned above do not occur. Also, each positive feedback loop has a frequency variable width only as much as needed for this loop. Therefore, it is possible to obtain a good signal purity as compared with the conventional optical deflector using a wide-band variable frequency generator.

The present invention is not limited to the foregoing embodiments but many modifications and variations are possible within the spirit and scope of the appended claims of the invention. For example, although the ordinary single electrode has been shown as the comb shaped electrode in each schematic perspective view showing the embodiment, a double electrode in which each pair of comb portions are extended may be used to reduce the influence of the reflection between electrodes of the surface acoustic wave. In addition, although the voltage controlled variable phase shifter of FIG. 6 has been shown as an example of the variable phase shifters, the variable phase shifter is not limited to such a type of phase shifter but the invention may use any other variable phase shifter such as a phase shifter using a variable capacitor due to mechanical control, a CR type voltage controlled variable phase shifter in which inductance parts were removed for excitation proof, or the like.

The arrangement of FIG. 7 has been shown as an example of the phase locked loop frequency synthesizer shown in the third embodiment. However, in place of this synthesizer, the invention may use a constitution such that the signal which is generated from the voltage controlled generator is phase locked by the reference signal and thereby regulating the signal and controlling the oscillating frequency from the outside.

Further, in the embodiment using the multiple tilted transducer array of FIG. 8, four pairs of comb shaped electrodes were used as an example. However, it can be easily understood by those skilled in the art that the use of a plurality of pairs of comb shaped electrodes can present a method which is substantially equal to that embodiment. In this embodiment as well, the frequency control may be performed by a phase locked loop frequency synthesizer.

In the embodiments of the invention shown in FIGS. 2 to 8, the grating couplers have been shown as an example of the input/output photocouplers. However, it will be obviously understood that the invention is not limited to the grating couplers but can be also applied to the case where any photocouplers are used.

As described above, according to the surface acoustooptic wave deflector of the invention, the high frequency signal for excitation of the surface acoustic wave is generated by the positive feedback type generator constituted by the closed loop including the comb shaped electrodes for excitation and reception. Therefore, the external oscillating circuit which has conventionally needed is unnecessary and the purity and stability of the high frequency signal for excitation of the surface acoustic wave are improved. Moreover, the occurrence of the unnecessary surface acoustic wave which has conventionally been absorbed by the ultrasonic absorbing material can be reduced.

I claim:

1. A surface acoustic wave generating apparatus comprising:
   a thin film optical waveguide path for transmitting a elastic surface acoustic wave;
   an input photocoupler for guiding light into said optical waveguide path from the outside;
   at least one elastic surface acoustic wave exciting means for exciting an elastic surface acoustic wave to be transmitted in said optical waveguide path, at least part of said elastic surface acoustic wave crossing the light guided into said optical waveguide path and deflecting the light based on an acoustic optical effect;
   at least one elastic surface acoustic wave receiving means provided in a transmission path of the elastic surface acoustic wave excited by said elastic surface acoustic wave exciting means and for converting the received elastic surface acoustic wave to a electrical signal;
   an electric circuit for amplifying the electric signal converted by said elastic surface acoustic wave receiving means and performing positive feedback with regard to the amplified electric signal, said electric circuit forming a closed loop together with said elastic surface acoustic wave exciting means and said elastic surface acoustic wave receiving means, said electric circuit, said exciting means and said receiving means together constituting an oscillator; and
   an output photocoupler for outputting the transmitted light to the outside.

2. A surface acoustooptic wave deflector according to claim 1, wherein said elastic surface acoustic wave exciting means and said elastic surface acoustic wave receiving means consist of comb shaped electrodes, respectively.

3. A surface acoustooptic wave deflector according to claim 1, wherein said electric circuit further includes a variable phase shifter, thereby allowing said positive feedback type generator to constitute a variable frequency generator.

4. A surface acoustooptic wave deflector according to claim 3, wherein said oscillator is a phase locked loop frequency synthesizer.

5. A surface acoustooptic wave deflector according to claim 4, wherein said oscillator includes: a variable frequency divider for frequency dividing a signal from said amplifier; a quartz oscillator; a phase detector for comparing a phase of a reference signal from said quartz oscillator with a phase of a signal from said variable frequency divider and locking the phase of the latter signal to the phase of the former signal; and a low-pass filter connected between said phase detector and said variable phase shifter.

6. A surface acoustooptic wave deflector according to claim 1, wherein said elastic surface acoustic wave exciting means is a multiple tilted transducer array having a plurality of sets of said comb shaped electrodes.

7. A surface acoustooptic wave deflector according to claim 7, wherein said elastic surface acoustic wave receiving means includes a plurality of sets of said comb shaped electrodes, and each set of said comb shaped electrodes of said array forms a closed loop together with each set of the comb shaped electrodes of said wave receiving means, and said electric circuit includes an amplifier and a variable phase shifter, together constituting a positive feedback type generator.

8. A surface acoustooptic wave deflector according to claim 7, further comprising a control circuit which generates ON/OFF signals of said respective amplifiers and control signals of said respective variable phase shifters and controls the elastic surface acoustic wave which is generated from each set of said comb shaped electrodes of said array.

9. A surface acoustooptic wave deflector according to claim 1, wherein said elastic surface acoustic wave receiving means is provided in the transmitting path of a part of the elastic surface acoustic wave different from said part of the elastic surface acoustic wave which is transmitted in the direction crossing the transmitted light.

* * * * *